United States Patent
Miyake et al.

(10) Patent No.: US 7,999,985 B2
(45) Date of Patent: Aug. 16, 2011

(54) OPTICAL SCANNING DEVICE AND IMAGE FORMING APPARATUS

(75) Inventors: Shinsuke Miyake, Kanagawa (JP); Nobuaki Kubo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 78 days.

(21) Appl. No.: 12/553,777

(22) Filed: Sep. 3, 2009

(65) Prior Publication Data

US 2010/0060963 A1  Mar. 11, 2010

(30) Foreign Application Priority Data

Sep. 5, 2008 (JP) ................. 2008-227709
Mar. 19, 2009 (JP) ................. 2009-067167

(51) Int. Cl.
*G02B 26/08* (2006.01)
(52) U.S. Cl. .................. 359/197.1
(58) Field of Classification Search ............ 359/197.1, 359/507; 358/1.4
See application file for complete search history.

(56) References Cited

U.S. PATENT DOCUMENTS

| 6,376,837 | B1 | 4/2002 | Itabashi et al. |
| 7,301,554 | B2 | 11/2007 | Kubo |
| 7,545,547 | B2 | 6/2009 | Hayashi et al. |
| 2006/0209372 | A1 | 9/2006 | Tada |
| 2007/0146738 | A1* | 6/2007 | Nakajima ............ 358/1.4 |
| 2008/0123159 | A1 | 5/2008 | Hayashi et al. |
| 2008/0219601 | A1 | 9/2008 | Arai et al. |
| 2009/0052944 | A1 | 2/2009 | Kubo et al. |
| 2009/0060583 | A1 | 3/2009 | Amada et al. |

FOREIGN PATENT DOCUMENTS

| JP | 60-10143 | 4/1985 |
| JP | 2001-260417 | 9/2001 |
| JP | 2002-40350 | 2/2002 |
| JP | 2003-170624 | 6/2003 |
| JP | 2004-198698 | 7/2004 |
| JP | 2005-156933 | 6/2005 |
| JP | 2006-91157 | 4/2006 |
| JP | 2006-259098 | 9/2006 |
| JP | 2007-164103 | 6/2007 |
| JP | 2007-185918 | 7/2007 |

* cited by examiner

*Primary Examiner* — Euncha P Cherry
(74) *Attorney, Agent, or Firm* — Dickstein Shapiro LLP

(57) ABSTRACT

A light beam splitting element that is arranged on an optical path of a light beam emitted from a VCSEL element splits an incident light beam into a first light beam and a second light beam. An optical system focuses the first light beam on the scanning surface and moves an optical spot formed by a focused light beam on the scanning surface in the main scanning direction. A light receiving element that is mounted on a circuit board receives the second light beam. A dust-proof member bridges a space between the circuit board and a circuit-board holding member that holds the circuit board and surrounds the light receiving element.

15 Claims, 18 Drawing Sheets

FIG. 5A
FIG. 5B
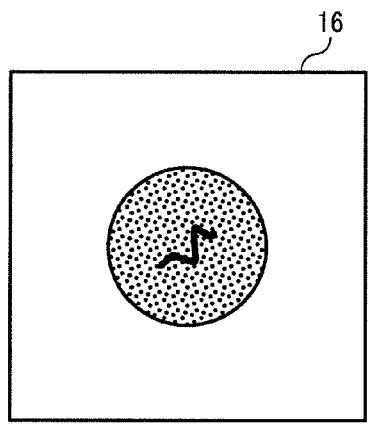
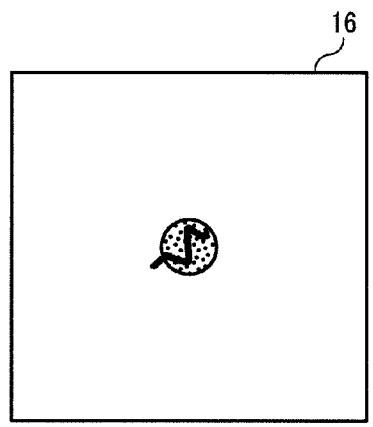
FIG. 6
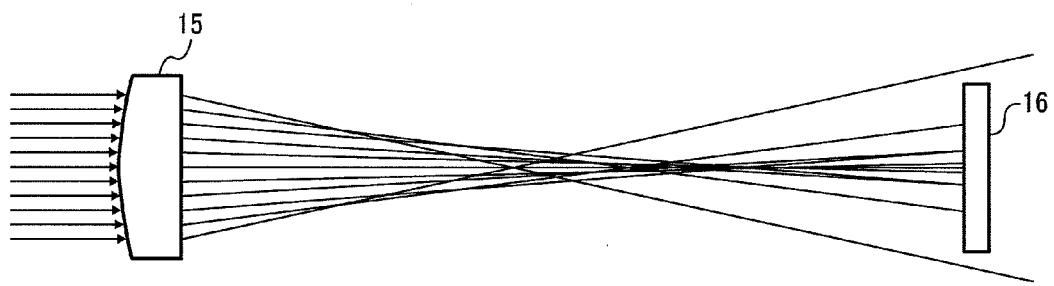

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2008-227709 filed in Japan on Sep. 5, 2008 and Japanese Patent Application No. 2009-067167 filed in Japan on Mar. 19, 2009.

BACKGROUND OF THE INVENTION

1. Field of the Invention

The present invention relates to an optical scanning device and an image forming apparatus, and more particularly, to an optical scanning device that scans a scanning surface with a light beam and an image forming apparatus including the optical scanning device.

2. Description of the Related Art

For electrophotographic image recording, an image forming apparatus using a laser as a light source is widely used. Such an image forming apparatus includes an optical scanning device in which a light beam (a scanning light beam) emitted from the light source is deflected by a deflector to scan a surface of a photosensitive drum with the light beam by which a latent image is formed on the surface of the photosensitive drum.

Such an image forming apparatus has a problem that shading may appear on an output image because optical intensities of scanning light beams vary with a change in temperature or over time. To cope with this problem, an optical scanning device using a conventional edge emitting laser performs an automatic power control (APC) while monitoring optical intensity of a light beam emitted from the other facet of the laser. However, in an optical scanning device using a vertical cavity surface emitting laser (VCSEL), because the VCSEL only emits a light beam from the top surface, it is configured that a light receiving element such as a photodiode receives a portion of a light beam emitted from the VCSEL to monitor optical intensity of the light beam (hereinafter, "a monitoring light beam"), and the optical scanning device performs the APC based on the optical intensity of the monitoring light beam (for example, see Japanese Patent Application Laid-open No. 2002-40350, Japanese Patent Application Laid-open No. 2006-91157, Japanese Patent Application Laid-open No. 2005-156933, and Japanese Patent Application Laid-open No. 2006-259098).

Generally, air flows inside an optical scanning device or inside an image forming apparatus, and in which dust or dirt flies with the airflow. If dust or dirt is attached to a light receiving element or a laser chip, optical intensity of a light beam traveling toward a scanning surface may be affected.

For example, there has been developed an apparatus using a surface emitting laser as a light source. The apparatus is arranged on an optical path of a light beam emitted from the surface emitting laser, and splits the incident light beam so as to use a portion of the light beam as a monitoring light beam (for example, see Japanese Patent Application Laid-open No. H8-33061). In such an apparatus, a light receiving element that receives the monitoring light beam is exposed to the air in which dust or dirt constantly exists. Therefore, it is highly likely that the dust or dirt is attached to a light receiving surface of the light receiving element, resulting in degradation of the monitoring performance.

SUMMARY OF THE INVENTION

It is an object of the present invention to at least partially solve the problems in the conventional technology.

According to one aspect of the present invention, there is provided an optical scanning device that scans a scanning surface with a light beam in a main scanning direction. The optical scanning device includes: a vertical cavity surface emitting laser element that emits a light beam; a light beam splitting element that is arranged on an optical path of the light beam and splits an incident light beam into a first light beam and a second light beam; an optical system that focuses the first light beam on the scanning surface and moves an optical spot formed by a focused light beam on the scanning surface in the main scanning direction; a light receiving element that receives the second light beam; a circuit board on which the light receiving element is mounted; a circuit-board holding member that holds the circuit board; and a dust-proof member that bridges a space between the circuit board and the circuit-board holding member and surrounds the light receiving element.

Furthermore, according to another aspect of the present invention, there is provided an image forming apparatus including at least one image carrier and at least one optical scanning device that scans the image carrier with a light beam modulated to image data in a main scanning direction. The optical scanning device includes a vertical cavity surface emitting laser element that emits a light beam, a light beam splitting element that is arranged on an optical path of the light beam and splits an incident light beam into a first light beam and a second light beam, an optical system that focuses the first light beam on the scanning surface and moves an optical spot formed by a focused light beam on the scanning surface in the main scanning direction, a light receiving element that receives the second light beam, a circuit board on which the light receiving element is mounted, a circuit-board holding member that holds the circuit board, and a dust-proof member that bridges a space between the circuit board and the circuit-board holding member and surrounds the light receiving element.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 5A and 5B are schematic diagrams for explaining a relation between a size of an optical spot and an output from the light receiving element when dirt is attached to a light receiving surface of the light receiving element;

FIG. 6 is a schematic diagram for explaining a case where a focus position of a light beam through the focusing lens is anterior to the light receiving element;

FIGS. 11A and 11B are schematic diagrams for explaining a dust-proof member of the light source device;

DETAILED DESCRIPTION OF THE PREFERRED EMBODIMENTS

Exemplary embodiments of the present invention are explained in detail below with reference to the accompanying drawings.

Figure 1:
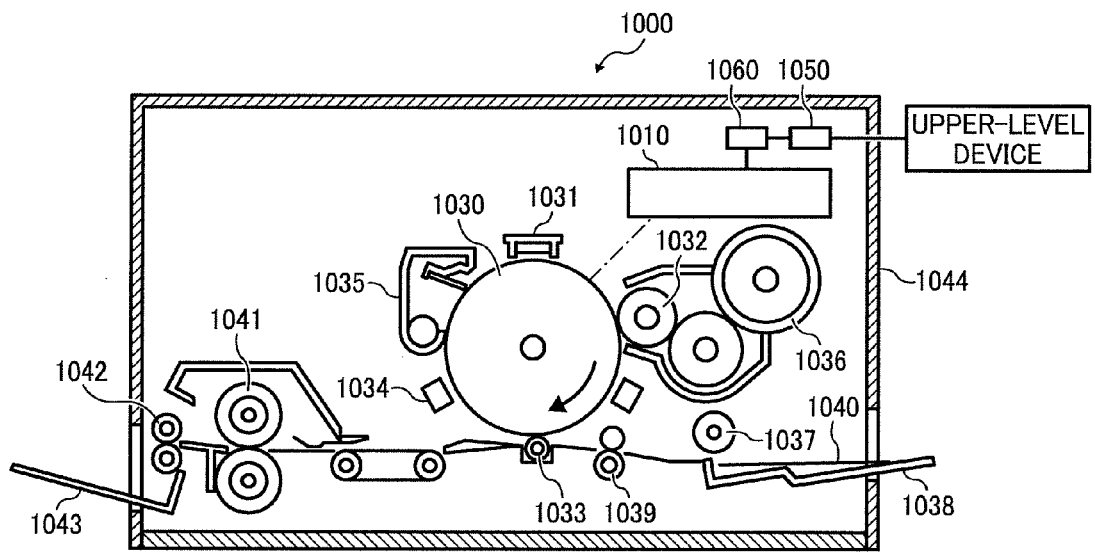
FIG. 1 is a schematic diagram of a laser printer according to an embodiment of the present invention.

FIG. 1 is a schematic diagram of a laser printer 1000 as an image forming apparatus according to an embodiment of the present invention. The laser printer 1000 includes an optical scanning device 1010, a photosensitive drum 1030, a charger 1031, a developing roller 1032, a transfer charger 1033, a neutralizing unit 1034, a cleaning unit 1035, a toner cartridge 1036, a sheet feed roller 1037, a sheet feed tray 1038, a pair of registration rollers 1039, a fixing roller 1041, a sheet discharge roller 1042, a copy receiving tray 1043, a communication control unit 1050, a printer control unit 1060 for controlling the above units entirely, and the like. Incidentally, these units are housed in a printer enclosure 1044, and arranged at predetermined positions in the printer enclosure 1044.

The communication control unit 1050 controls a two-way communication between the laser printer 1000 and an upper-level device (for example, a personal computer) via a network.

The photosensitive drum 1030 is a cylindrical member, and a photosensitive layer is formed on the surface thereof. The surface of the photosensitive drum 1030 is a scanning surface. The photosensitive drum 1030 rotates in a direction of an arrow shown in FIG. 1.

The charger 1031, the developing roller 1032, the transfer charger 1033, the neutralizing unit 1034, and the cleaning unit 1035 are arranged around the surface of the photosensitive drum 1030 in this order in a rotating direction of the photosensitive drum 1030.

The charger 1031 uniformly charges the surface of the photosensitive drum 1030.

The optical scanning device 1010 emits a light beam modulated based on image data transmitted from the upper-level device to the uniformly-charged surface of the photosensitive drum 1030. By the exposure to the light beam, a latent image corresponding to the image data is formed on the surface of the photosensitive drum 1030. The formed latent image is carried toward the developing roller 1032 in accordance with the rotation of the photosensitive drum 1030. A configuration of the optical scanning device 1010 will be described in detail later.

The toner cartridge 1036 contains therein toner. The toner is supplied to the developing roller 1032.

The developing roller 1032 develops the latent image formed on the surface of the photosensitive drum 1030 into a toner image by attaching the toner supplied from the toner cartridge 1036 to the latent image. The toner image is carried toward the transfer charger 1033 in accordance with the rotation of the photosensitive drum 1030.

The sheet feed tray 1038 contains therein recording sheets 1040. The sheet feed roller 1037 is arranged near the sheet feed tray 1038. The sheet feed roller 1037 picks up the recording sheet 1040 one by one from the sheet feed tray 1038, and conveys the picked-up recording sheet 1040 to the registration rollers 1039. The registration rollers 1039 temporarily hold the recording sheet 1040 conveyed from the sheet feed roller 1037, and convey the recording sheet 1040 toward a gap between the photosensitive drum 1030 and the transfer charger 1033 in synchronization with the toner image carried on the surface of the photosensitive drum 1030.

To electrically-attract the toner on the surface of the photosensitive drum 1030 to the recording sheet 1040, a voltage of a polarity opposite to that of the toner is applied to the transfer charger 1033. By the voltage, the toner image on the surface of the photosensitive drum 1030 is transferred onto the recording sheet 1040. The recording sheet 1040 on which the toner image is transferred is conveyed to the fixing roller 1041.

The fixing roller 1041 applies heat and pressure to the recording sheet 1040. By the application of heat and pressure, the toner image is fixed on the recording sheet 1040. Then, the recording sheet 1040 is conveyed to the copy receiving tray 1043 through the sheet discharge roller 1042, and sequentially stacked on the copy receiving tray 1043.

The neutralizing unit 1034 neutralizes the electric charge on the surface of the photosensitive drum 1030.

The cleaning unit 1035 removes toner (residual toner) remaining on the surface of the photosensitive drum 1030. Incidentally, the residual toner removed by the cleaning unit 1035 is collected to be reused. The photosensitive drum 1030 from which the residual toner is removed returns to the original position opposed to the charger 1031.

Subsequently, the configuration of the optical scanning device 1010 is explained below.

Figure 2:
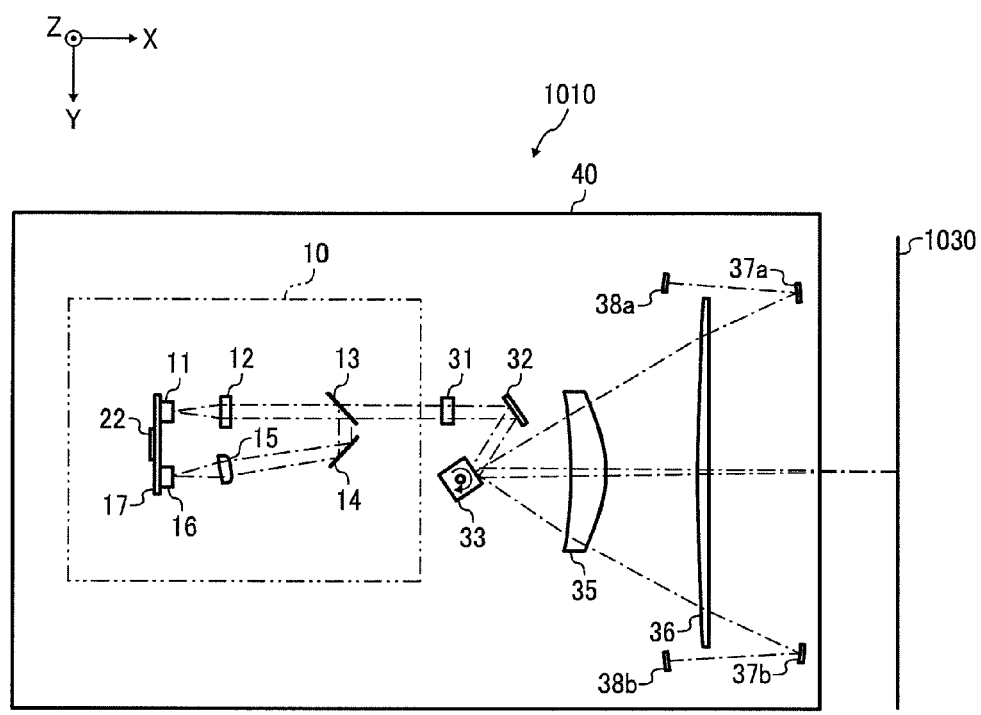
FIG. 2 is a schematic diagram of an optical scanning device shown in FIG. 1.

As shown in FIG. 2 as an example, the optical scanning device 1010 includes a light source device 10, a cylindrical lens 31, a scanning-light beam reflecting mirror 32, a polygon mirror 33, a deflector-side scanning lens 35, an image-plane-side scanning lens 36, two light-detection mirrors 37a and 37b, two light-detection sensors 38a and 38b, and the like. These are set up at predetermined positions in an optical housing 40.

Incidentally, in the present specification, based on an X-Y-Z three-dimensional orthogonal coordinate system, a direction along a long side of the photosensitive drum 1030 shall be referred to as a Y-axis direction, and a direction along an optical axis of each of the scanning lenses 35 and 36 shall be referred to as an X-axis direction.

Furthermore, for the sake of convenience, hereinafter, a direction corresponding to a main scanning direction shall be referred to as "a main-scanning corresponding direction", and a direction corresponding to a sub-scanning direction shall be referred to as "a sub-scanning corresponding direction".

The light source device 10 includes a light source 11, a coupling lens 12, an aperture plate 13, a monitoring-light beam reflecting mirror 14, a focusing lens 15, a light receiving element 16, and a light-source control unit 22. Incidentally, the light source 11, the light receiving element 16, and the light-source control unit 22 are mounted on a circuit board 17.

Figure 3:
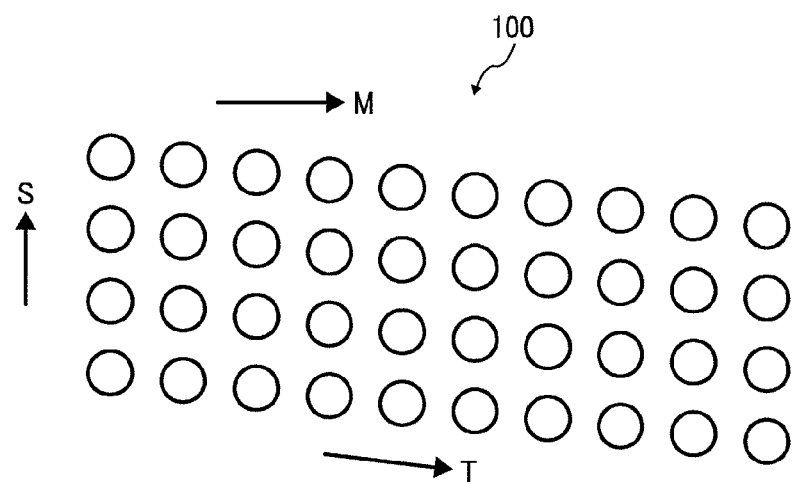
FIG. 3 is a schematic diagram for explaining a two-dimensional array of a VCSEL included in a light source shown in FIG. 2.

As shown in FIG. 3 as an example, the light source 11 includes a two-dimensional array 100 of forty light-emitting ports, in which the light-emitting ports are two-dimensionally arrayed and formed on one substrate. An M-direction in FIG. 3 is the main-scanning corresponding direction (in this case, identical to the Y-axis direction), and an S-direction is the sub-scanning corresponding direction (in this case, identical to a Z-axis direction).

The forty light-emitting ports are arrayed so as to be spaced at regular intervals when all the light-emitting ports are orthographically projected onto a virtual line extending in the S-direction. Incidentally, in the present specification, "the intervals of the light-emitting ports" means a distance between the centers of the two adjacent light-emitting ports.

Furthermore, each of the light-emitting ports is a VCSEL having an oscillation wavelength band of 780 nanometers (nm). In other words, the two-dimensional array 100 is a surface-emitting laser array of the forty light-emitting ports.

To return to FIG. 2, the coupling lens 12 shapes a light beam emitted from the light source 11 into a substantially parallel light beam.

The aperture plate 13 has an aperture, and defines a light beam diameter of the light beam through the coupling lens 12. The aperture plate 13 is made of a reflective material.

As a light beam reflected by the aperture plate 13 is used as a monitoring light beam, the aperture plate 13 is arranged to be tilted to a virtual plane perpendicular to a traveling direction of the light beam through the coupling lens 12.

The monitoring-light beam reflecting mirror 14 is arranged on an optical path of the monitoring light beam reflected by the aperture plate 13, and reflects the monitoring light beam to a direction toward the light receiving element 16.

Figure 4:
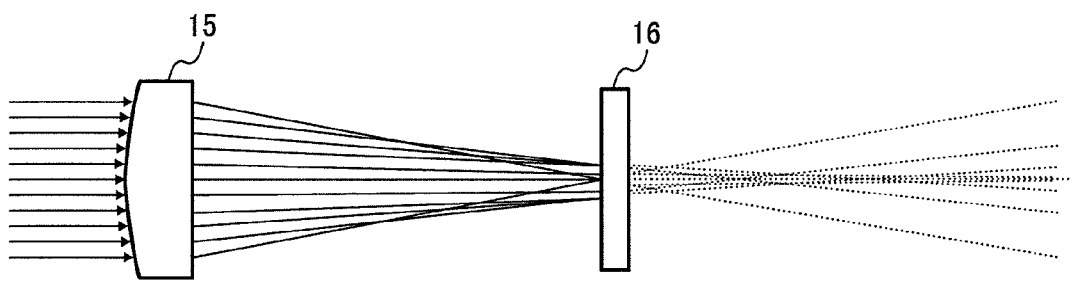
FIG. 4 is a schematic diagram for explaining a positional relation between a focusing lens and a light receiving element.

The focusing lens 15 is arranged on an optical path of the monitoring light beam reflected by the monitoring-light beam reflecting mirror 14, and focuses the monitoring light beam. In the present embodiment, as shown in FIG. 4 as an example, the focusing lens 15 is set so that the monitoring light beam is focused posterior to the light receiving element 16.

Therefore, a light beam diameter on a light receiving surface of the light receiving element 16 is relatively large. Thus, even if an extraneous substance is attached to the light receiving surface, or the light receiving surface has a scratch, it is possible to prevent a significant decrease in amount of light received. In other words, it is possible to reduce the effect of the extraneous substance or the scratch on the light receiving surface (see FIG. 5A).

Incidentally, if the focusing lens 15 is set so that the monitoring light beam is focused anterior to the light receiving element 16, an amount of light received significantly decreases due to the scratch on the light receiving surface, and thus a correct signal may not be output (see FIG. 5B).

Furthermore, if the focusing lens 15 is set so that the monitoring light beam is focused anterior to the light receiving element 16, as shown in FIG. 6 as an example, some of the light beam may not be received by the light receiving element 16, which results in a decrease in light use efficiency.

The light receiving element 16 outputs a signal (a photo-electric conversion signal) depending on an amount of light received.

Figure 7:
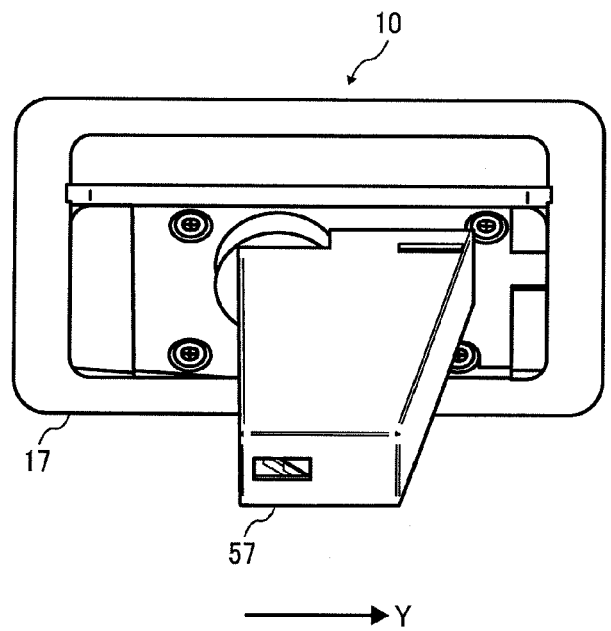
FIG. 7 is an appearance diagram of a light source device shown in FIG. 2.

FIG. 7 illustrates an appearance of the light source device 10.

Figure 8:
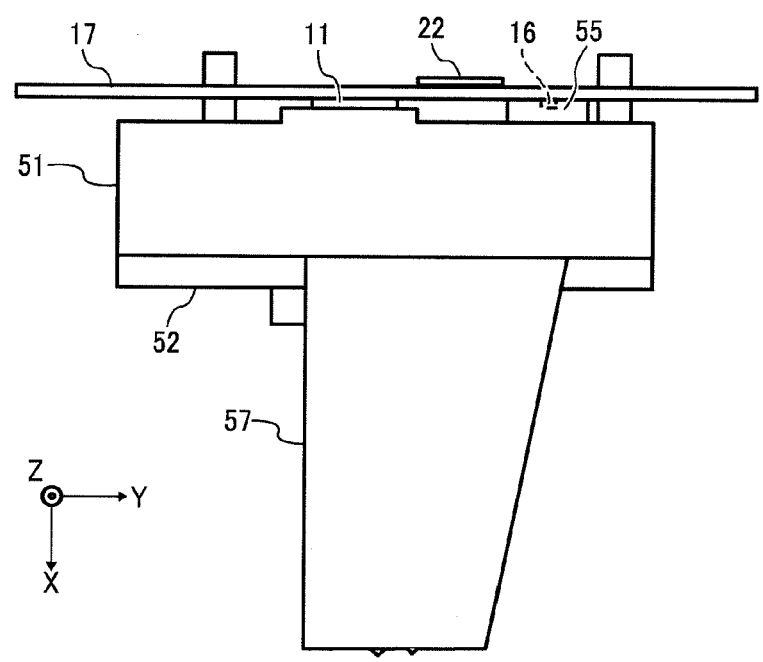
FIG. 8 is a schematic diagram for explaining holding members of the light source device.

As shown in FIG. 8, the light source device 10 further includes a first holding member 51, a second holding member 52, a dust-proof member 55, and a dust-proof cover 57.

Figure 9:
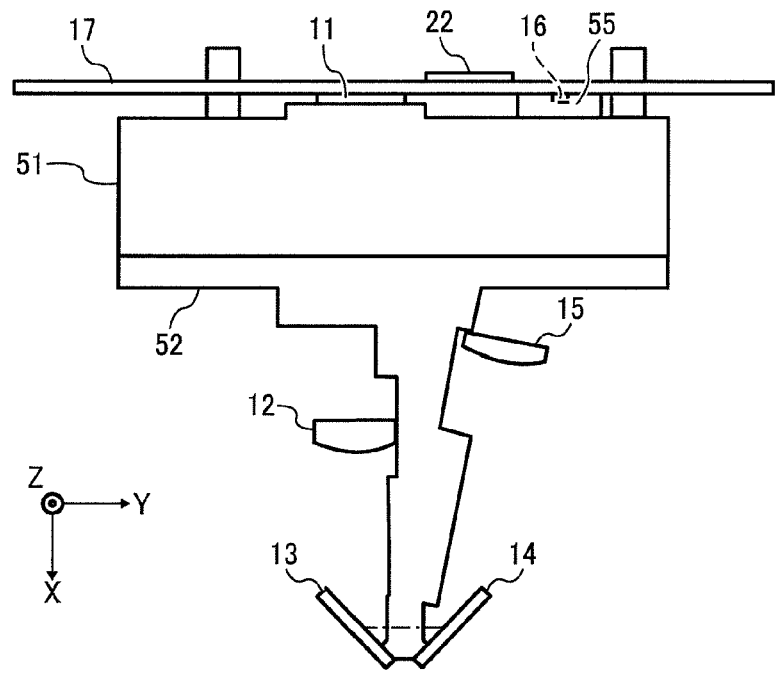
FIG. 9 is another schematic diagram for explaining the holding members of the light source device.

As shown in FIG. 9, the coupling lens 12, the aperture plate 13, the monitoring-light beam reflecting mirror 14, and the focusing lens 15 are held by the second holding member 52 in a predetermined position relation.

The circuit board 17 and the second holding member 52 are fixed to the −X and +X sides of the first holding member 51, respectively, so that the light source 11 and the coupling lens 12 are in a predetermined position relation.

On each of the first holding member 51 and the second holding member 52, a through-hole through which a light beam from the light source 11 passes and a through-hole through which a light beam traveling toward the light receiving element 16 passes are formed.

Figure 10:
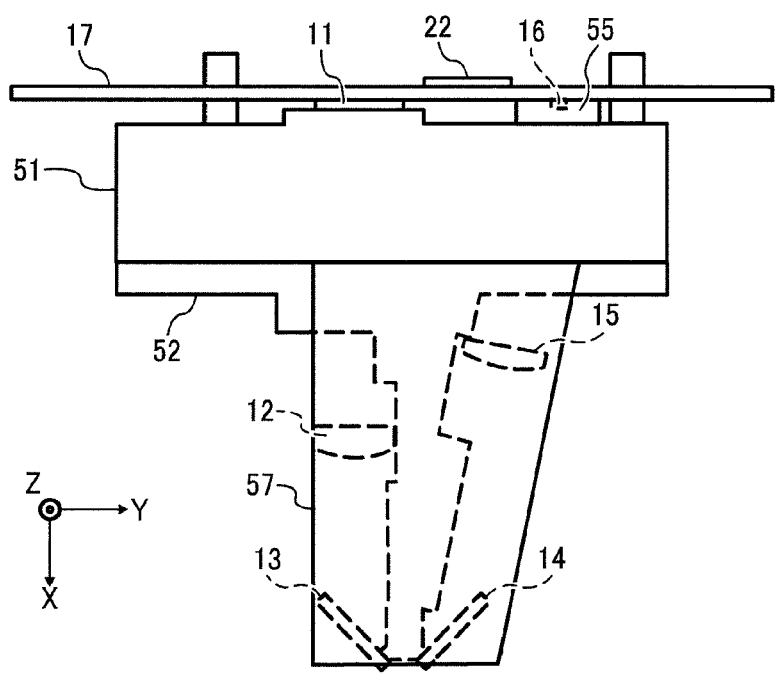
FIG. 10 is a schematic diagram for explaining a dust-proof cover of the light source device.

As shown in FIG. 10, the dust-proof cover 57 covers the coupling lens 12, the aperture plate 13, the monitoring-light beam reflecting mirror 14, and the focusing lens 15 to prevent dust or dirt from being attached to them. The dust-proof cover 57 has an aperture through which a light beam passing through the aperture of the aperture plate 13 passes.

The dust-proof member 55 is provided to prevent dust or dirt from coming in through a space between the circuit board 17 and the first holding member 51 and being attached to the light receiving surface of the light receiving element 16. As shown in FIG. 11A as an example, as a passageway of the light beam traveling toward the light receiving element 16, an aperture is formed on the center of the dust-proof member 55.

Figure 11B:
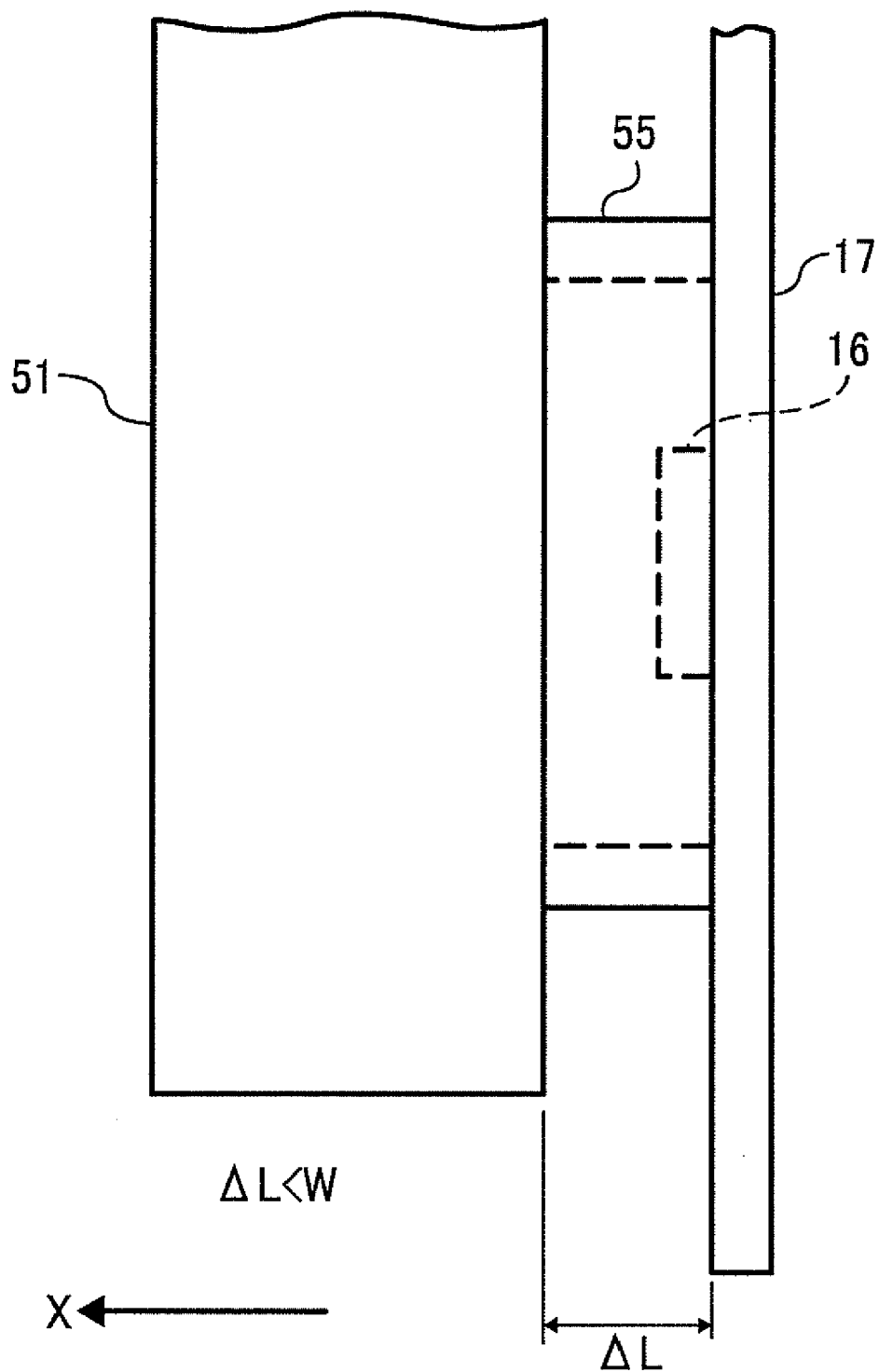

The dust-proof member 55 is made of an elastic material such as polyurethane foam. As shown in FIG. 11B as an example, the dust-proof member 55 is inserted into a space between the circuit board 17 and the first holding member 51 in a state where the dust-proof member 55 elastically contracts. Therefore, the dust-proof member 55 can be in close contact with the circuit board 17 and the first holding member 51. Alternatively, the dust-proof member 55 can be at least partially made of the elastic material.

Figure 12:
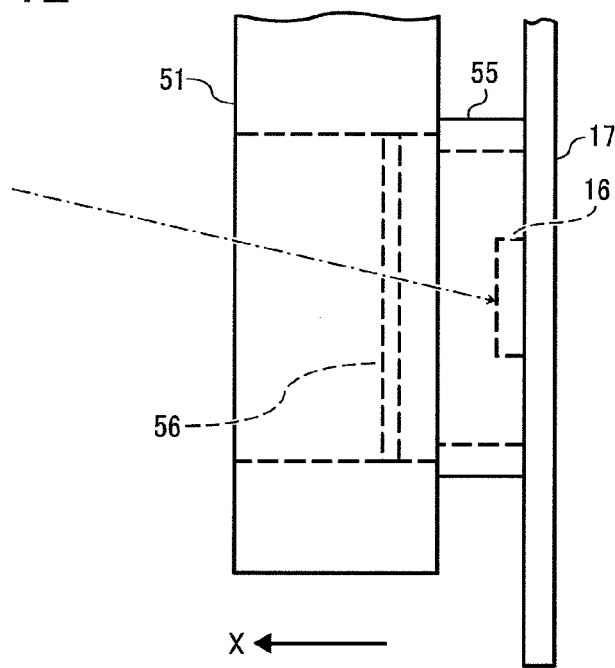
FIG. 12 is a schematic diagram for explaining a dust-proof glass of the light source device.

As shown in FIG. 12 as an example, the light source device 10 further includes a dust-proof glass 56. The dust-proof glass 56 is provided inside the through-hole of the first holding member 51 through which the light beam traveling toward the light receiving element 16 passes.

The dust-proof glass 56 prevents dust or dirt from coming in through the first holding member 51 and being attached to the light receiving surface of the light receiving element 16.

Figure 13:
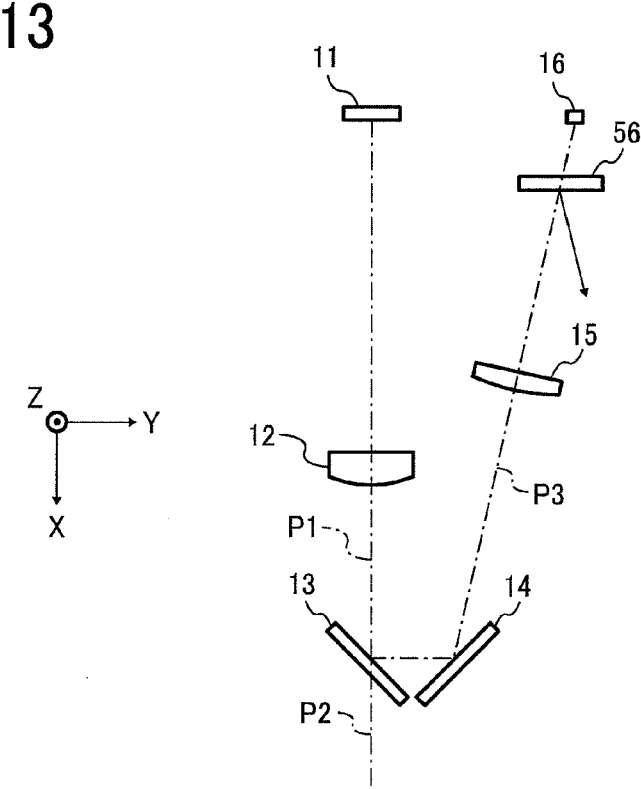
FIG. 13 is a schematic diagram illustrating a light beam reflected by the dust-proof glass of the light source device.

The dust-proof glass 56 is set so that the light beam traveling toward the light receiving element 16 obliquely enters the dust-proof glass 56. Therefore, as shown in FIG. 13 as an example, it is possible to prevent the light beam reflected by the surface of the dust-proof glass 56 from returning back to the light source 11. In other words, it is possible to prevent unstable laser oscillation, noise generation, and a decrease in laser power in the light source 11.

Figure 14A:
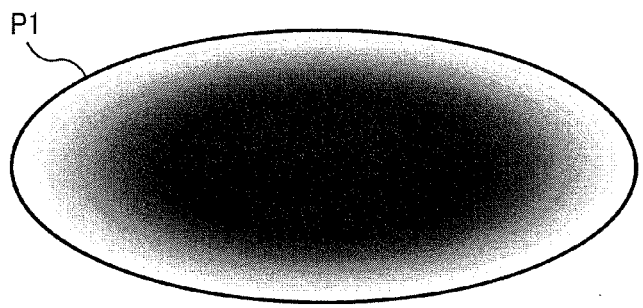
FIGS. 14A to 14C are schematic diagrams illustrating shapes of light beams P1, P2, and P3.
Figure 14B:
Figure 14C:
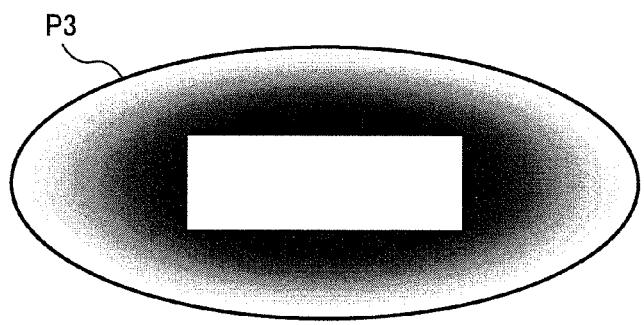

FIG. 14A illustrates a shape of a light beam P1 entering the aperture plate 13. FIG. 14B illustrates a shape of a light beam P2 passing through the aperture of the aperture plate 13. FIG. 14C illustrates a shape of a light beam P3 reflected by the aperture plate 13. When a optical intensity of the light beam P1 is changed, optical intensities of the light beams P2 and P3 are also changed. In other words, the optical intensity of the light beam P2 and the optical intensity of the light beam P3 behave in unison.

Figure 15:
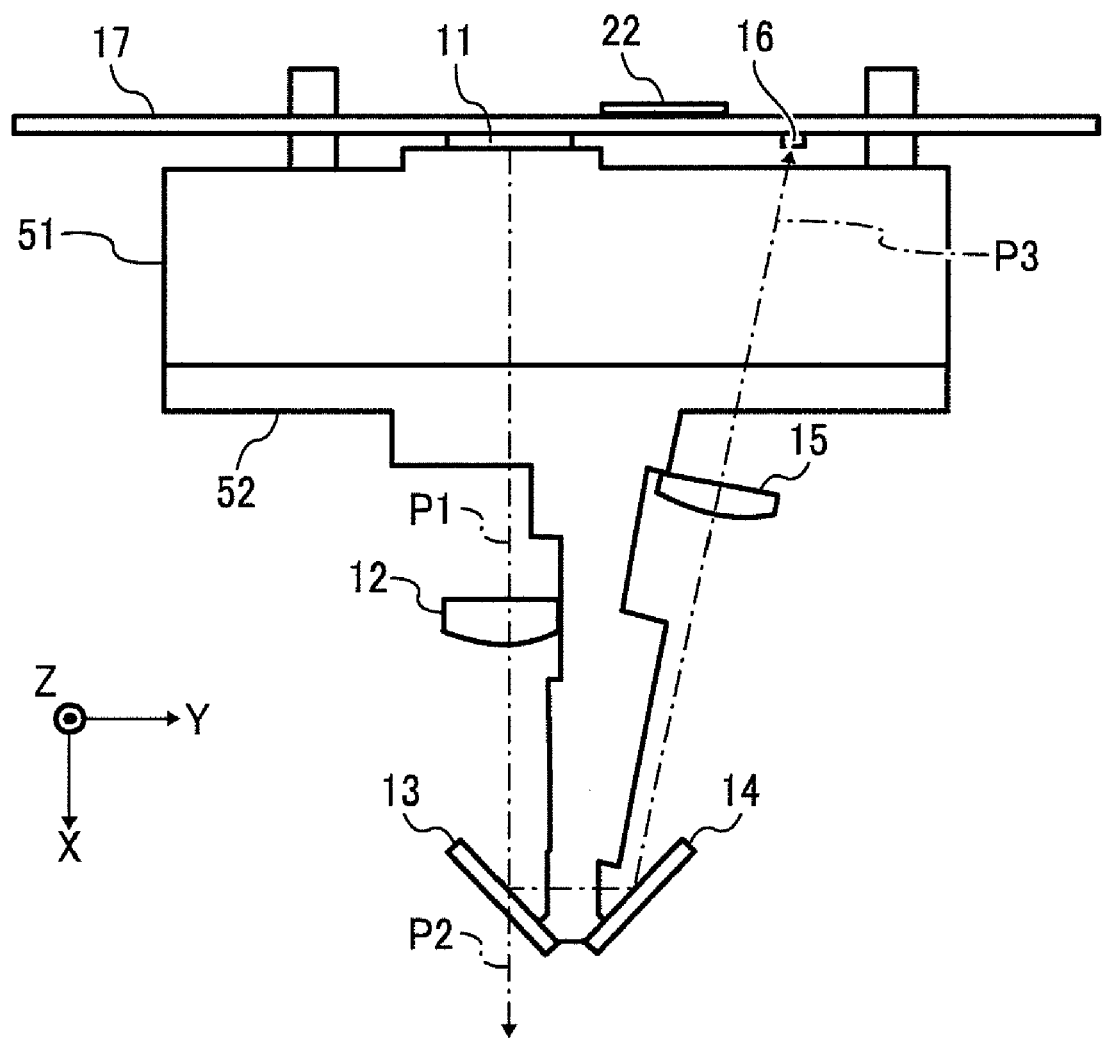
FIG. 15 is a schematic diagram for explaining a case where the dust-proof member is not provided to the light source device.
Figure 16A:
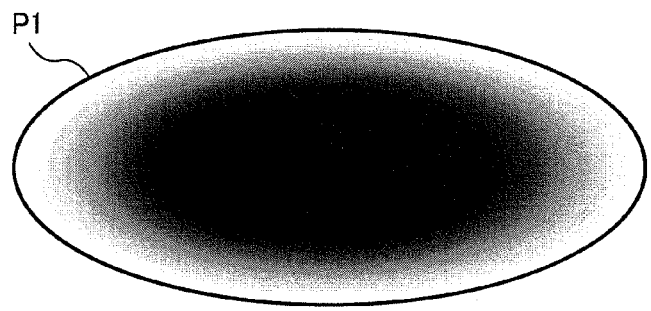
FIGS. 16A to 16C are schematic diagrams for explaining the effect of dust attached to the light receiving surface of the light receiving element.
Figure 16B:
Figure 16C:
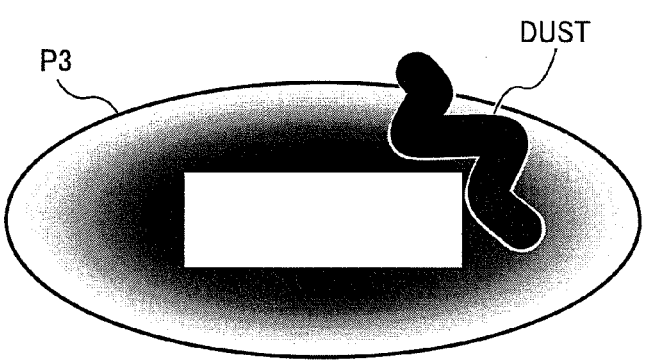

As shown in FIG. 15, if the dust-proof member 55 is not provided to the light source device 10, an extraneous substance such as dust is easily attached to the light receiving surface of the light receiving element 16. If the extraneous substance is attached to the light receiving surface of the light receiving element 16, even though the optical intensities of the light beams P1 and P2 are not changed as shown in FIGS. 16A and 16B, the optical intensity of the light beam P3 decreases as shown in FIG. 16C as an example. In other words, there is interference with normal monitoring of the optical intensity.

To return to FIG. 2, the cylindrical lens 31 focuses the light beam passing through the aperture of the aperture plate 13 on near a deflection reflecting surface of the polygon mirror 33 in the Z-axis direction via the scanning-light beam reflecting mirror 32.

The optical system arranged on an optical path between the light source 11 and the polygon mirror 33 is also called an optical system anterior to the deflector. In the present embodiment, the optical system anterior to the deflector is composed of the coupling lens 12, the aperture plate 13, the cylindrical lens 31, and the scanning-light beam reflecting mirror 32.

As an example, the polygon mirror 33 has four sides, i.e., four mirror surfaces, and a radius of an inscribed circle of the polygon mirror 33 is 7 millimeters (mm). Each of the mirror surfaces is the deflection reflecting surface. The polygon mirror 33 deflects the light beam from the scanning-light beam reflecting mirror 32 while rotating about an axis parallel to the Z-axis direction at the constant speed.

The deflector-side scanning lens 35 is arranged on an optical path of the light beam deflected by the polygon mirror 33.

The image-plane-side scanning lens 36 is arranged on an optical path of the light beam through the deflector-side scanning lens 35. The light beam through the image-plane-side scanning lens 36 is irradiated to the surface of the photosensitive drum 1030, and an optical spot is formed thereon. The optical spot moves in a direction of the long side of the photosensitive drum 1030 in accordance with the rotation of the polygon mirror 33. In other words, the photosensitive drum 1030 is scanned by the optical spot. The moving direction of the optical spot is "the main scanning direction", and the rotating direction of the photosensitive drum 1030 is "the sub-scanning direction".

The optical system arranged on an optical path between the polygon mirror 33 and the photosensitive drum 1030 is also called a scanning optical system. In the present embodiment, the scanning optical system is composed of the deflector-side scanning lens 35 and the image-plane-side scanning lens 36. Incidentally, at least one reflecting mirror can be arranged on any of an optical path between the deflector-side scanning lens 35 and the image-plane-side scanning lens 36 and an optical path between the image-plane-side scanning lens 36 and the photosensitive drum 1030.

Out of the light beam that is deflected by the polygon mirror 33 and passes through the scanning optical system, a portion of the light beam before being written on the surface of the photosensitive drum 1030 enters the light-detection sensor 38*a* via the light-detection mirror 37*a*. On the other hand, out of the light beam that is deflected by the polygon mirror 33 and passes through the scanning optical system, a portion of the light beam after being written on the surface of the photosensitive drum 1030 enters the light-detection sensor 38*b* via the light-detection mirror 37*b*.

Each of the light-detection sensors 38*a* and 38*b* produces an electrical signal (a photoelectric conversion signal) depending on an amount of light received, and outputs the produced electrical signal to the light-source control unit 22.

Figure 17:
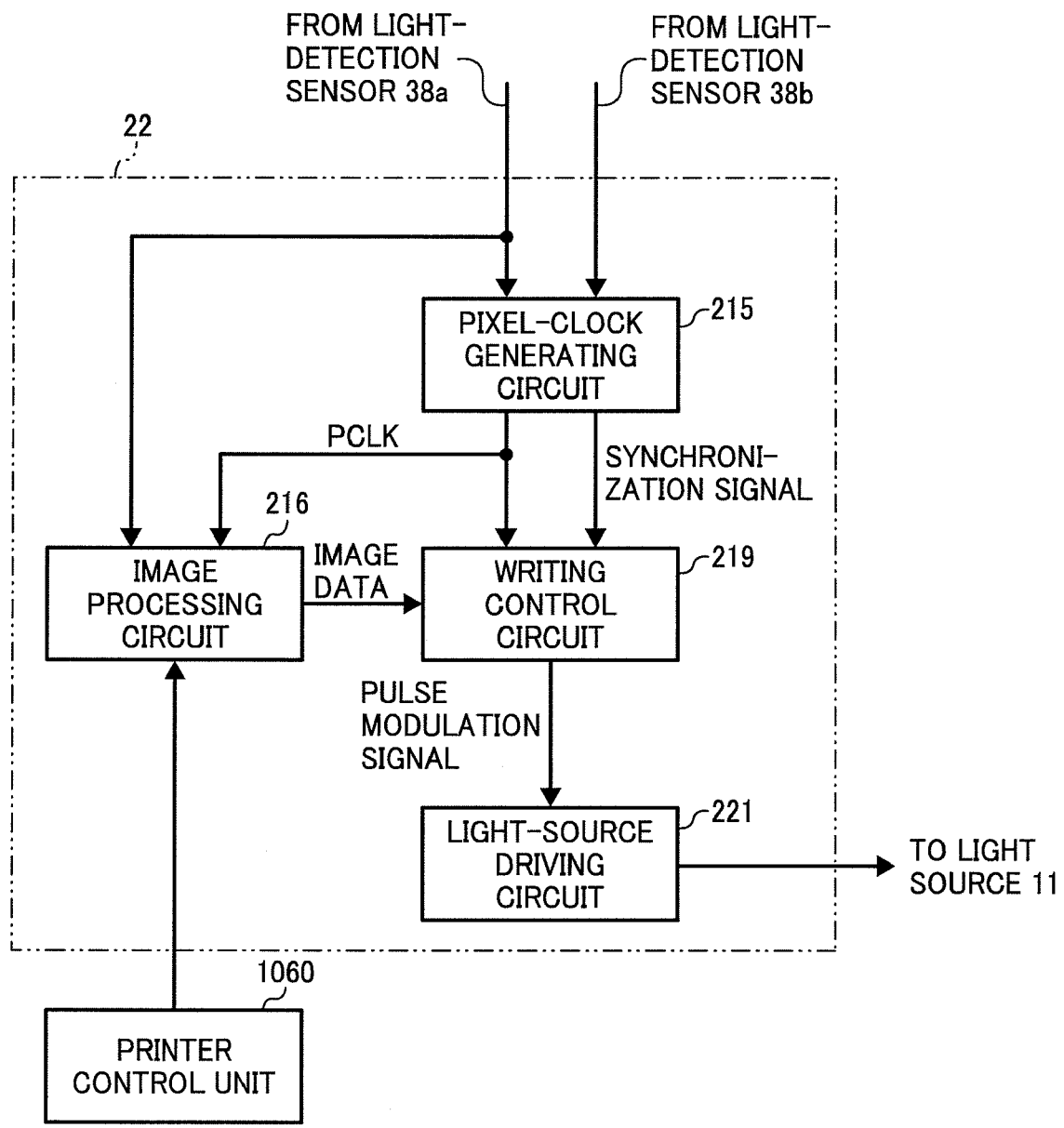
FIG. 17 is a block diagram of a light-source control unit.

As shown in FIG. 17 as an example, the light-source control unit 22 includes a pixel-clock generating circuit 215, an image processing circuit 216, a writing control circuit 219, a light-source driving circuit 221, and the like. Incidentally, arrows shown in FIG. 17 indicate not all connection configurations among blocks but flows of main signals and data.

The pixel-clock generating circuit 215 obtains a time for the light beam to pass through each of the light-detection sensors 38*a* and 38*b* based on an output signal from each of the light-detection sensors 38*a* and 38*b*, sets a frequency so that preset numbers of pulses fall within the time, and generates a pixel clock signal PCLK of the frequency. The generated pixel clock signal PCLK is output to the image processing circuit 216 and the writing control circuit 219. Furthermore, the output signal from the light-detection sensor 38*a* is output to the writing control circuit 219 as a synchronization signal.

The image processing circuit 216 rasterizes image data received from the upper-level device via the printer control unit 1060, and performs a predetermined halftone process or the like on the image data. After that, the image processing circuit 216 creates image data representing a gray level of each pixel on the basis of the pixel clock signal PCLK with respect to each light-emitting port. When detecting the start of scanning based on the output signal from the light-detection sensor 38*a*, the image processing circuit 216 outputs the image data to the writing control circuit 219 in synchronization with the pixel clock signal PCLK.

The writing control circuit 219 generates a pulse modulation signal based on the image data from the image processing circuit 216, the pixel clock signal PCLK and a synchronization signal from the pixel-clock generating circuit 215.

The light-source driving circuit 221 drives each of the light-emitting ports of the two-dimensional array 100 based on the pulse modulation signal from the writing control circuit 219.

The light-source control unit 22 is housed in a Quad Flat Package (QFP) type package.

As can be seen from the above description, in the optical scanning device 1010 according to the present embodiment, the optical system is composed of the polygon mirror 33, the deflector-side scanning lens 35, and the image-plane-side scanning lens 36.

As described above, the optical scanning device 1010 according to the present embodiment includes the light source device 10, the cylindrical lens 31, the polygon mirror 33, the deflector-side scanning lens 35, the image-plane-side scanning lens 36, and the like.

The light source device 10 includes the light source 11; the coupling lens 12; the aperture plate 13; the monitoring-light beam reflecting mirror 14; the focusing lens 15; the dust-proof cover 57 for protecting the coupling lens 12, the aperture plate 13, the monitoring-light beam reflecting mirror 14, and the focusing lens 15 from dust or dirt; and the dust-proof member 55 and the dust-proof glass 56 for protecting the light receiving surface of the light receiving element 16 from dust or dirt.

By such a configuration, a change in optical intensity of each of light beams emitted from the two-dimensional array 100 can be detected stably and accurately. Therefore, stable light beam emission can be achieved by APC.

Thus, it is possible to achieve accurate and stable optical scanning of the surface of the photosensitive drum 1030.

Furthermore, the laser printer 1000 according to the present embodiment includes the optical scanning device 1010 capable of scanning the surface of the photosensitive drum 1030 accurately and stably, and thus it is possible to form a high-quality image stably.

Incidentally, when there is no possibility of a decrease in light use efficiency, the focusing lens 15 can be set so that the monitoring light beam is focused anterior to the light receiving element 16.

Moreover, in the above embodiment, as members for protection from an extraneous substance, the dust-proof cover 57, the dust-proof member 55, and the dust-proof glass 56 are provided to the light source device 10. Alternatively, any one or two of these members can be provided to the light source device 10 depending on circumstances of the light source device 10 and the shape of the holding member.

Furthermore, in the above embodiment, the holding member is composed of the separate first and second holding members 51 and 52. However, the holding member is not limited to this configuration. For example, the first and second holding members 51 and 52 can be combined in an integrated manner, or the holding member can be composed of three or more holding members.

Figure 18:
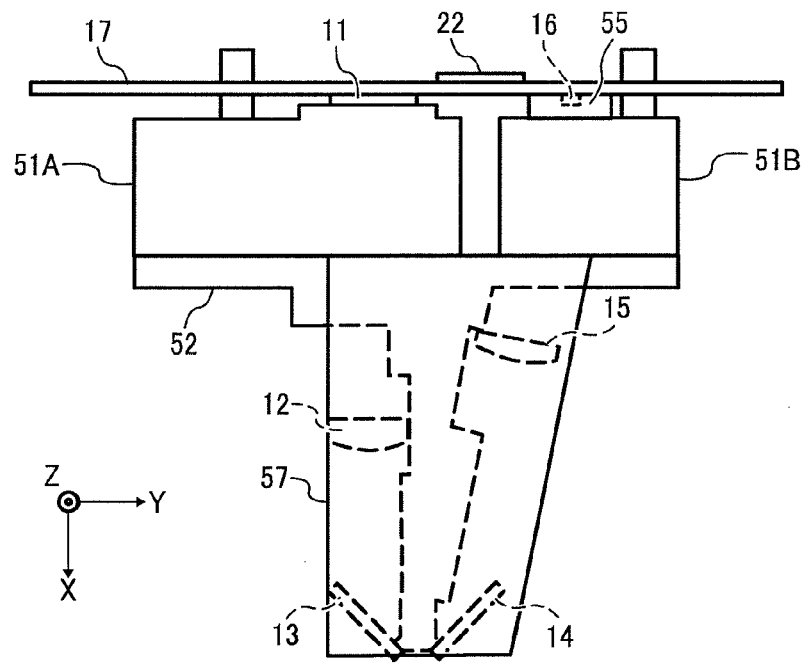
FIG. 18 is a schematic diagram for explaining a first modified example of the light source device.

Moreover, the first holding member 51 can be composed of two parts 51A and 51B as shown in FIG. 18 as an example. In this case, the part 51A holds the light source 11, and the part 51B holds the light receiving element 16.

Furthermore, in the above embodiment, it is configured that the light beam passing through the coupling lens 12 enters the aperture plate 13. However, it is not limited to this configuration. Alternatively, it can be configured that the light beam passing through the aperture of the aperture plate 13 enters the coupling lens 12. In this case, the coupling lens 12 can be included in the light source device 10, or not included in the light source device 10.

Moreover, in the above embodiment, the aperture plate 13 is used as a light beam splitting element. However, it is not limited to the aperture plate. Instead of the aperture plate, any other optical elements can be used as long as the optical elements can split a light beam from the light source into a scanning light beam and a monitoring light beam. For example, a half mirror can be used instead of the aperture plate.

Furthermore, in the above embodiment, the light source 11 includes the forty light-emitting ports. However, the number of the light-emitting ports is not limited to forty. Alternatively, the light source 11 can be configured to include one light-emitting port.

Moreover, instead of the two-dimensional array 100, one-dimensional array of a plurality of light-emitting ports that the light-emitting ports are one-dimensionally arrayed can be used.

Furthermore, in the above embodiment, the dust-proof member 55 made of the elastic material is used. Alternatively, a material such as polyamide resin can be used as the dust-proof member 55. Incidentally, a material of the dust-proof member 55 preferably has an insulation property to avoid an electrical interference caused by contact between a metal part on the circuit board 17 and the dust-proof member 55.

Moreover, in the above embodiment, the light source 11 and the light receiving element 16 are mounted on the circuit board 17. However, it is not limited to this configuration. Alternatively, the light source 11 and the light receiving element 16 can be mounted on different circuit boards.

Figure 19:
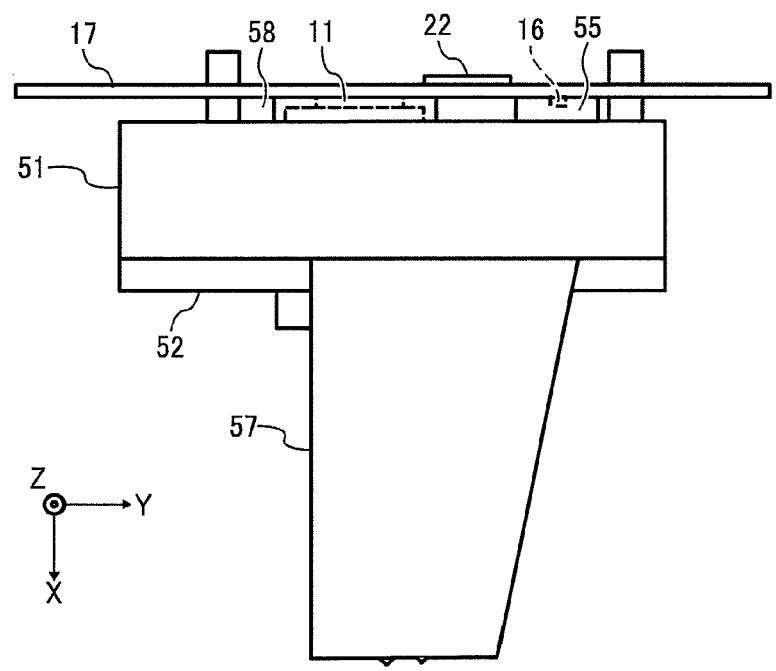
FIG. 19 is a schematic diagram for explaining a second modified example of the light source device.

Furthermore, in case an extraneous substance such as dust comes in through the space between the circuit board 17 and the first holding member 51, and is attached to the light-emitting port of the light source 11, as shown in FIG. 19 as an example, a surrounding member 58 can be provided to surround the light source 11 and also to bridge the space between the circuit board 17 and the first holding member 51.

Figure 20A:
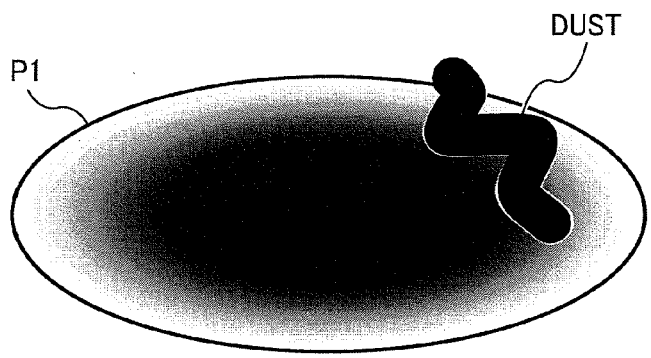
FIGS. 20A to 20C are schematic diagrams for explaining the effect of dust attached to a light-emitting port.
Figure 20B:
Figure 20C:
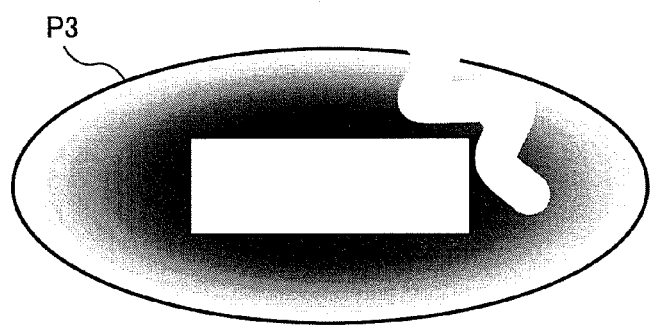

For example, as shown in FIG. 20A, when a portion of the periphery of a light beam P1 is blocked by dust attached to the light-emitting port of the light source 11, although a optical intensity of a light beam P2 is not affected by the dust attached to the light-emitting port of the light source 11, a optical intensity of a light beam P3 is affected by the dust attached to the light-emitting port of the light source 11, as shown in FIGS. 20B and 20C. In this case, even though the optical intensity of the light beam P2 is not changed, an amount of the light beam P3 to be received decreases. In other words, there is interference with normal monitoring of the optical intensity.

Figure 21:
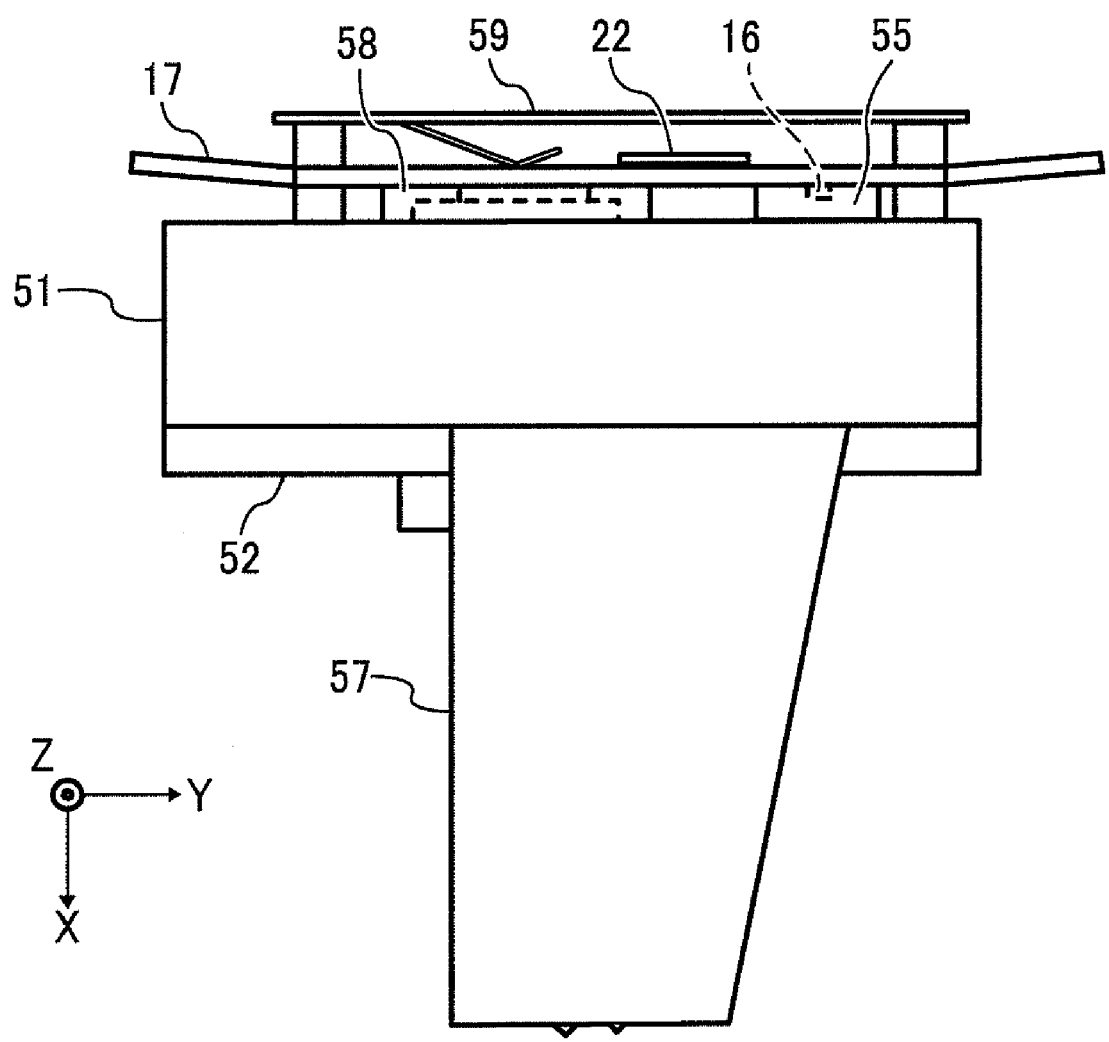
FIG. 21 is a schematic diagram for explaining a third modified example of the light source device.

By providing the surrounding member 58, if there is a possibility that the light source 11 is away from a contact portion of the first holding member 51, and a space is formed between the light source 11 and the first holding member 51, as shown in FIG. 21 as an example, a leaf spring 59 can be provided to press the light source 11 against the first holding member 51. By providing the leaf spring 59, the light source 11 can be brought into contact with the contact portion of the first holding member 51, and even when the surrounding member 58 is provided around the light source 11, it is possible to maintain the positioning accuracy of the light source 11. Incidentally, in this case, the leaf spring 59 can press the light source 11 either indirectly via the circuit board 17 or directly.

Figure 22:
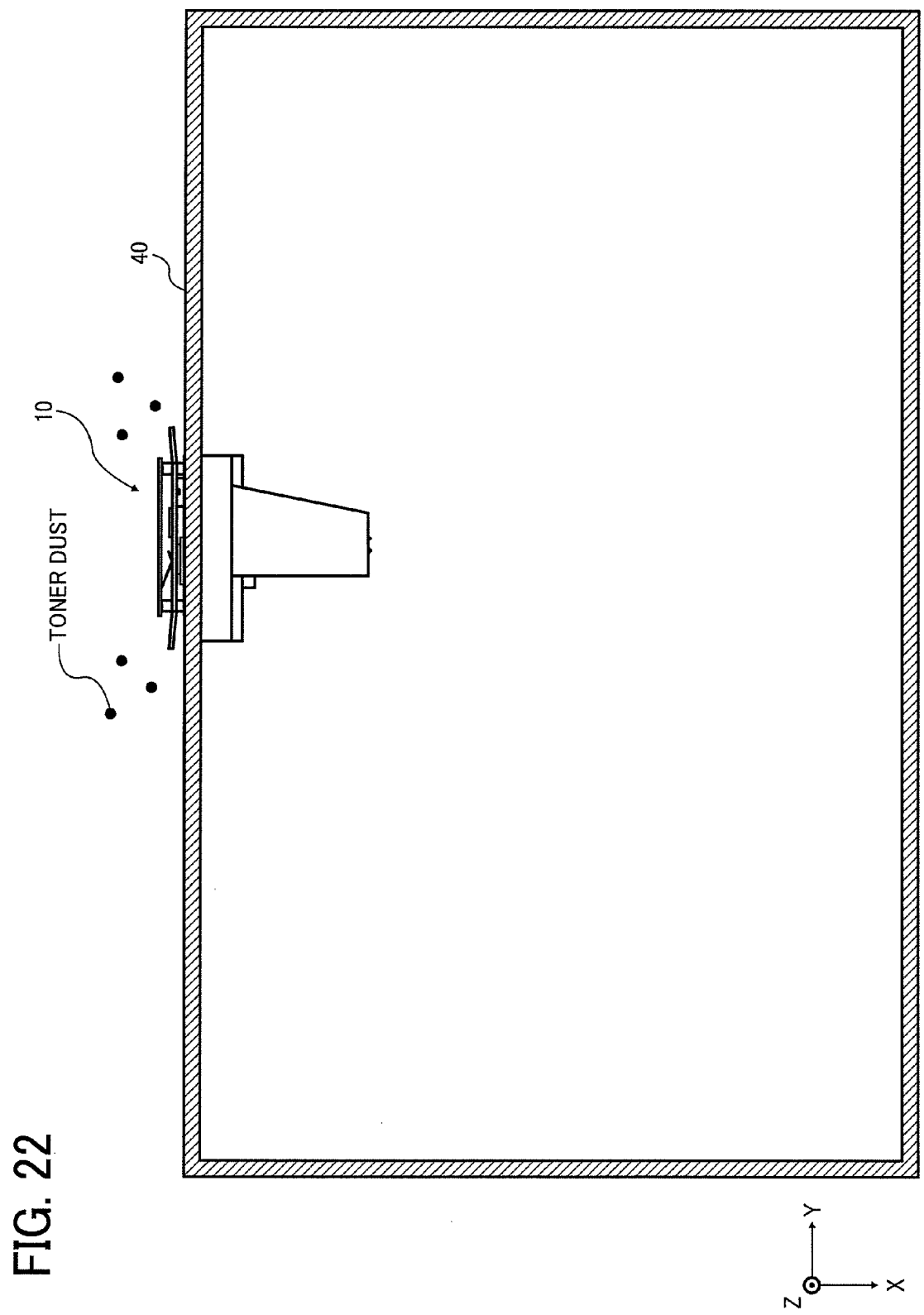
FIG. 22 is a schematic diagram for explaining a fourth modified example of the light source device.

Moreover, as shown in FIG. 22 as an example, the light source device 10 can be held on a side plate of the optical housing 40. In the example shown in FIG. 22, the first holding member 51 is attached to the side plate of the optical housing 40. Although dust prevention measures are taken with respect to inside the optical housing 40, toner dust or the like flies outside the optical housing 40. Even in this case, it is possible to monitor the optical intensity normally.

Figure 23:
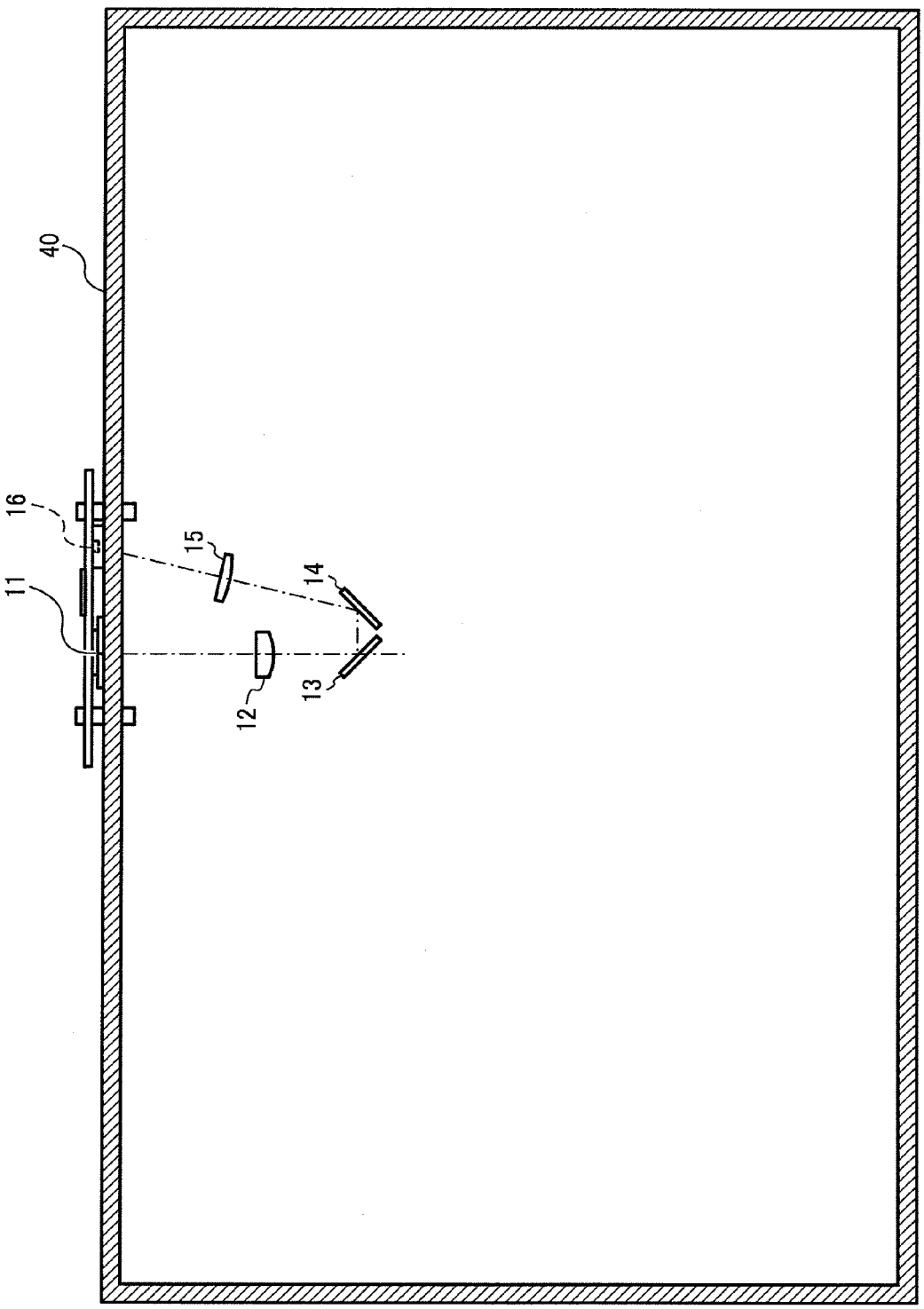
FIG. 23 is a schematic diagram for explaining a fifth modified example of the light source device.

Furthermore, as shown in FIG. 23 as an example, the first holding member 51 can be a portion of the side plate of the optical housing 40.

Figure 24:
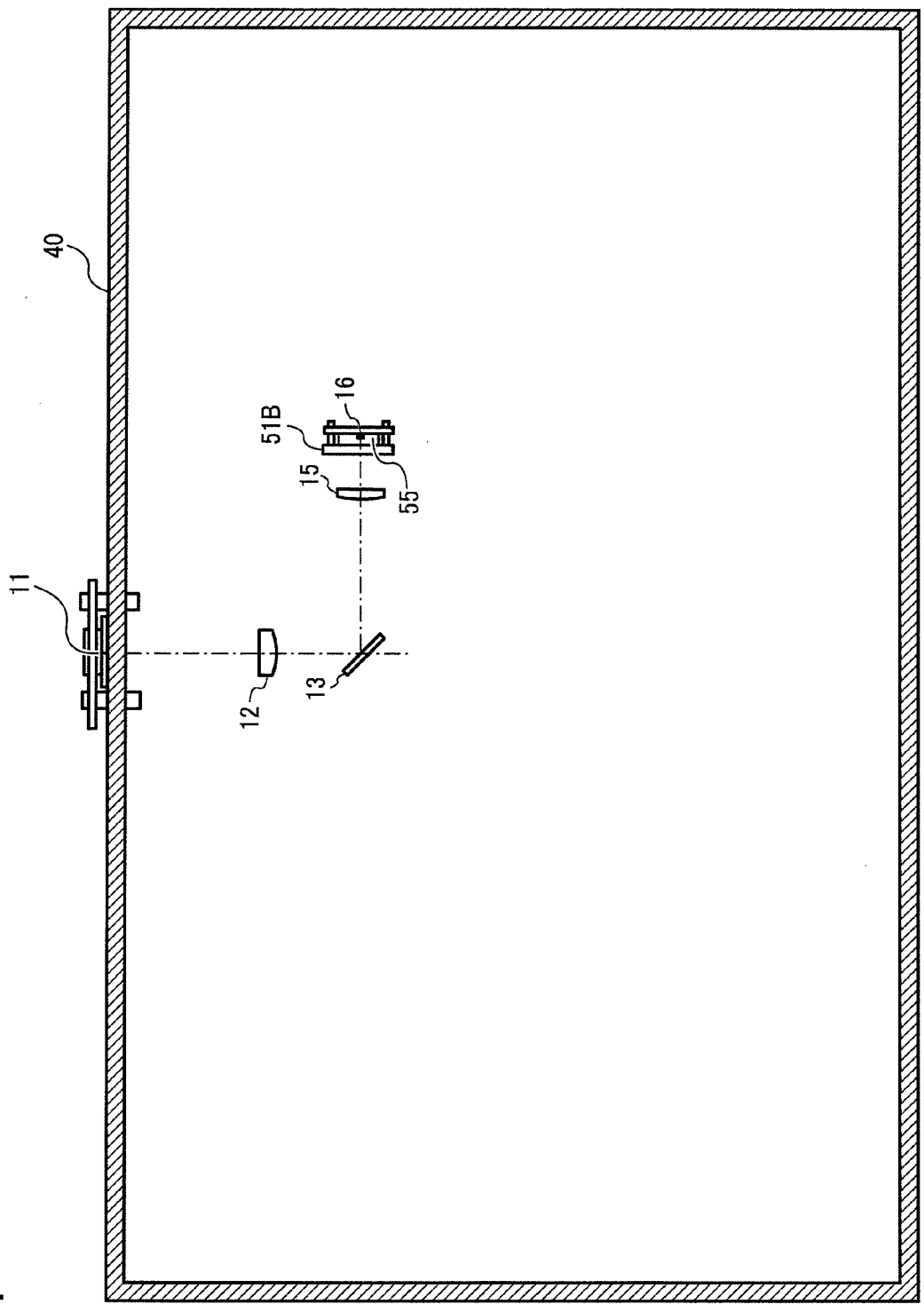
FIG. 24 is a schematic diagram for explaining a sixth modified example of the light source device.

Moreover, as shown in FIG. 24 as an example, a portion of the first holding member 51 can be a portion of the side plate of the optical housing 40.

Incidentally, in the above embodiment, the laser printer 1000 is described as the image forming apparatus. However, the present invention is not limited to a type of image forming apparatus. Basically, any kinds of image forming apparatuses can form a high-quality image stably of the image forming apparatuses include the optical scanning device 1010.

For example, the image forming apparatus can be the one that directly irradiates a laser light to a medium (for example, a sheet) having a property of being colored by the laser light.

Furthermore, the image forming apparatus can be the one using a silver halide film as an image carrier. In this image forming apparatus, a latent image is formed on the silver halide film by optical scanning. The latent image can be imaged by a developing process in a typical silver halide photographic process. Then, the image can be transferred onto a printing sheet by a printing process in the typical silver halide photographic process. Such an image forming apparatus can be applied to an optical plate-making apparatus or an optical image-drawing apparatus that draws a computed tomography scan image or the like.

Figure 25:
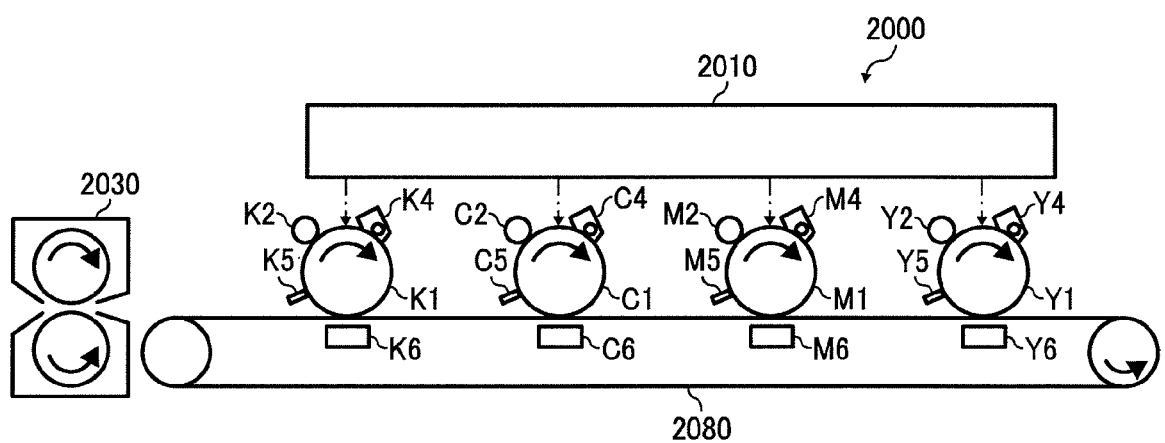
FIG. 25 is a schematic diagram of a color printer.

Moreover, for example, as shown in FIG. 25, the image forming apparatus can be a color printer 2000 including a plurality of photosensitive drums.

The color printer 2000 is a tandem multicolor printer capable of forming a full-color image by superimposition of four color (black (K), cyan (C), magenta (M), and yellow (Y) color) images. The color printer 2000 includes "a photosensitive drum K1, a charging unit K2, a developing unit K4, a cleaning unit K5, and a transfer unit K6" for forming a K-color image; "a photosensitive drum C1, a charging unit C2, a developing unit C4, a cleaning unit C5, and a transfer unit C6" for forming a C-color image; "a photosensitive drum M1, a charging unit M2, a developing unit M4, a cleaning unit M5, and a transfer unit M6" for forming an M-color image; "a photosensitive drum Y1, a charging unit Y2, a developing unit Y4, a cleaning unit Y5, and a transfer unit Y6" for forming a Y-color image; an optical scanning device 2010; a transfer belt 2080; a fixing unit 2030; and the like.

Each of the photosensitive drums rotates in a direction of an arrow shown in FIG. 25. The corresponding charging unit, developing unit, transfer unit, and cleaning unit are arranged around each of the photosensitive drums in this order. Each of the charging units uniformly charges the surface of the corresponding photosensitive drum. The optical scanning device 2010 emits lights to the uniformly-charged surfaces of the photosensitive drums, and an electrostatic latent image is formed on each of the surfaces of the photosensitive drums. The electrostatic latent image is developed into a toner image by the corresponding developing unit. Namely, Y, M, C, and K toner images are formed on the surfaces of the photosensitive drums Y1, M1, C1, and K1, respectively. The Y, M, C, and K toner images are sequentially transferred onto a recording sheet in a superimposed manner by the transfer units Y6, M6, C6, and K6, respectively. The superimposed toner images transferred onto the recording sheet are fixed on the recording sheet by the fixing unit 2030, and a full-color image is formed on the recording sheet.

The optical scanning device 2010 includes four light source devices for Y, M, C, and K-color images. The light source devices are similar to the light source device 10. Therefore, the optical scanning device 2010 can achieve the same effect as the optical scanning device 1010.

The color printer 2000 can achieve the same effect as the laser printer 1000.

Incidentally, in such a tandem multicolor printer, a color registration error may occur due to a degree of machine accuracy and the like. However, an accuracy of correcting the color registration error can be enhanced by selecting a light-emitting port to be lit.

Furthermore, in the color printer 2000, the light source devices with respect to each color can be provided, or the light source devices with respect to each two of the four colors can be provided.

According to one aspect of the present invention, it is possible to achieve accurate and stable optical scanning of a scanning surface.

Furthermore, according to another aspect of the present invention, it is possible to form a high-quality image stably.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that scans a scanning surface with a light beam in a main scanning direction, the optical scanning device comprising:
    a vertical cavity surface emitting laser element that emits a light beam;
    a light beam splitting element that is arranged on an optical path of the light beam and splits an incident light beam into a first light beam and a second light beam;
    an optical system that focuses the first light beam on the scanning surface and moves an optical spot formed by a focused light beam on the scanning surface in the main scanning direction;
    a light receiving element that receives the second light beam;
    a circuit board on which the light receiving element is mounted;
    a circuit-board holding member that holds the circuit board; and
    a dust-proof member that bridges a space between the circuit board and the circuit-board holding member and surrounds the light receiving element.

2. The optical scanning device according to claim 1, wherein the dust-proof member includes an elastic material.

3. The optical scanning device according to claim 1, further comprising a dust-proof cover that covers the light beam splitting element.

4. The optical scanning device according to claim 1, further comprising a dust-proof glass that is arranged on an optical path between the light beam splitting element and the light receiving element and prevents dust from being attached to the light receiving element.

5. The optical scanning device according to claim 4, wherein a normal direction of an incidence plane of the dust-proof glass is tilted with respect to a direction of a principal ray of the second light beam traveling toward the light receiving element.

6. The optical scanning device according to claim 1, further comprising a focusing lens that is arranged on an optical path between the light beam splitting element and the light receiving element, wherein
    the focusing lens focuses the second light beam traveling toward the light receiving element on a point ahead or behind the light receiving element.

7. The optical scanning device according to claim 1, wherein
    the light beam splitting element is an aperture member having an aperture,
    the first light beam is a light beam passing through the aperture, and
    the second light beam is a light beam reflected at a periphery of the aperture.

8. The optical scanning device according to claim 1, further comprising:
    a control board on which the vertical cavity surface emitting laser element is mounted;
    a control-board holding member that holds the control board; and
    a surrounding member that surrounds the vertical cavity surface emitting laser element and bridges a space between the control board and the control-board holding member.

9. The optical scanning device according to claim 8, further comprising a pressing member that presses the vertical cavity surface emitting laser element against the control-board holding member.

10. The optical scanning device according to claim 9, wherein the pressing member presses the vertical cavity surface emitting laser element by pressing the control board against the control-board holding member.

11. The optical scanning device according to claim 8, wherein the circuit-board holding member and the control-board holding member are formed in an integrated manner.

12. The optical scanning device according to claim 8, wherein the circuit board and the control board are formed in an integrated manner.

13. The optical scanning device according to claim 1, wherein the vertical cavity surface emitting laser element includes a plurality of light-emitting ports.

14. An image forming apparatus comprising: at least one image carrier; and
at least one optical scanning device that scans the image carrier with a light beam modulated to image data in a main scanning direction, the optical scanning device including
a vertical cavity surface emitting laser element that emits a light beam,
a light beam splitting element that is arranged on an optical path of the light beam and splits an incident light beam into a first light beam and a second light beam,
an optical system that focuses the first light beam on the scanning surface and moves an optical spot formed by a focused light beam on the scanning surface in the main scanning direction,
a light receiving element that receives the second light beam, a circuit board on which the light receiving element is mounted,
a circuit-board holding member that holds the circuit board, and
a dust-proof member that bridges a space between the circuit board and the circuit-board holding member and surrounds the light receiving element.

15. The image forming apparatus according to claim 14, wherein the image data is color image data.

* * * * *